United States Patent [19]

Rodenbaugh

[11] Patent Number: 4,630,268
[45] Date of Patent: Dec. 16, 1986

[54] COMMUNICATION CIRCUIT LOOPBACK TEST APPARATUS

[75] Inventor: Stephan M. Rodenbaugh, Allen, Tex.

[73] Assignee: Rockwell International Corporation, El Segundo, Calif.

[21] Appl. No.: 646,384

[22] Filed: Aug. 30, 1984

[51] Int. Cl.[4] .............................................. H04B 3/46
[52] U.S. Cl. ........................................ 371/22; 370/15; 379/4; 379/5
[58] Field of Search ...................... 371/11, 22; 370/15, 370/16, 88; 179/175.31 R, 175.3 A, 175.3 F, 175.35

[56] References Cited

U.S. PATENT DOCUMENTS

| | | | |
|---|---|---|---|
| 4,002,847 | 1/1977 | Dail | 370/15 |
| 4,006,320 | 2/1977 | Markl | 370/15 |
| 4,069,402 | 1/1978 | Mantovan | 371/22 |
| 4,112,263 | 9/1978 | Lender | 371/22 |
| 4,161,634 | 7/1979 | Bellisio | 179/175.31 R |
| 4,161,635 | 7/1979 | Wolaver | 179/175.31 R |
| 4,242,750 | 12/1980 | Finck | 371/22 |
| 4,271,514 | 6/1981 | Parras | 371/22 |
| 4,379,080 | 3/1982 | Kuwahara | 179/175.31 R |
| 4,402,075 | 8/1983 | Bargeton | 179/175.31 R |
| 4,564,933 | 1/1986 | Hirst | 371/22 |

Primary Examiner—Michael R. Fleming
Attorney, Agent, or Firm—Bruce C. Lutz; V. L. Sewell; H. Fredrick Hamann

[57] ABSTRACT

To perform a loopback condition for testing purposes, the present apparatus supplies a null signal from an end terminal on a communication link through a set of repeater stations to reinitialize the repeater stations. It then sends N+1 pulses of a frequency different than the data frequency through the repeater stations with each repeater station that receives more than two pulses disgarding one pulse and forwarding the rest. The repeater station or remote end terminal that receives only two pulses reconfigures itself to a loopback condition, returns a null signal back to the end terminal originally transmitting the N+1 pulses and then sends an acknowledgement pulse. Data signal testing can then be performed until a further null condition is sent thereby reinitializing the repeater stations to the data transmission configuration.

10 Claims, 14 Drawing Figures

COMMUNICATION CIRCUIT LOOPBACK TEST APPARATUS

THE INVENTION

The present invention is related generally to electronics and more specifically to communication links. Even more specifically, the invention is related to testing of individual repeater stations in a communication link between end terminals to successively place each repeater station in a loopback condition for testing purposes until the loopback request fails thereby providing an indication of the area in which the telecommunication problems are occurring.

BACKGROUND

The prior art method of implementing loopback of repeaters has been used by the Bell System for some time. In the prior art system, a phase modulation has been used to generate tone bursts and hardware is embedded in the data clock regeneration circuitry to detect these bursts. When using a phase modulation of the data signal, there is a resultant skewing of the output data and clock signals. At the prior art data frequency of 44 megabytes, the skewing of the output data lies within a reasonable range and the hardware design and additional analog circuitry is within a cost range that it is still somewhat cost effective. At frequencies of over 100 megabytes, the skew of the data requires special temperature compensation for the repeater circuitry and a closer tolerance on all clock generation specifications. Further, the analog circuitry needed to do the primary job of detection and to provide the clock extraction techniques becomes much more complex. Accordingly, the cost of such circuitry requires a further look at how the system can best be placed in a loopback condition for testing purposes.

Since the data being transmitted during test conditions is by definition not reliable and since loopback conditions in a repeater station between end terminals is going to disrupt some of the data anyhow, the present concept specifically interrupts all transmission of data by transmitting a null signal from one end terminal towards the other wherein each series connected repeater in succession is reinitialized to a startup condition. After sufficient time has passed for the repeaters to complete their reinitialization, a set of N+1 tone bursts are transmitted through the communication link from the end terminal. Each of the repeater stations prior to the Nth repeater station upon receiving more than two of the tone bursts of a frequency other than the data frequency signal will respond by forwarding to the next repeater in the series link one less pulse than it received. When a repeater station receives only two pulses of the test frequency tone burst, it reconfigures itself into a loopback condition and returns a null signal back to the sending end terminal. After an appropriate amount of time, a single pulse of the test frequency is sent back to the end terminal as an acknowledgement that the signal has been received and a loopback condition is in existence. The end terminal can now transmit actual data and test the returning data for identity for as long as is necessary to complete the test operation. If the test proves satisfactory, a new null signal is supplied to the communication link and one more pulse is added to the set of pulses than was previously transmitted and the next repeater station in line is set to a loopback condition. This process is repeated until a test fails thereby indicating the problem area in the communication link. Since repeater stations in present day communication links are in the neighborhood of 40 miles apart, the present testing eliminates a considerable amount of traveling that would have been involved in going to each repeater station to check operation.

It is therefore an object of the present invention to provide an improved communication link testing apparatus.

Other objects and advantages of the present invention will be ascertained from a reading of the specification and appended claims in conjunction with the drawings wherein:

Figure 2:
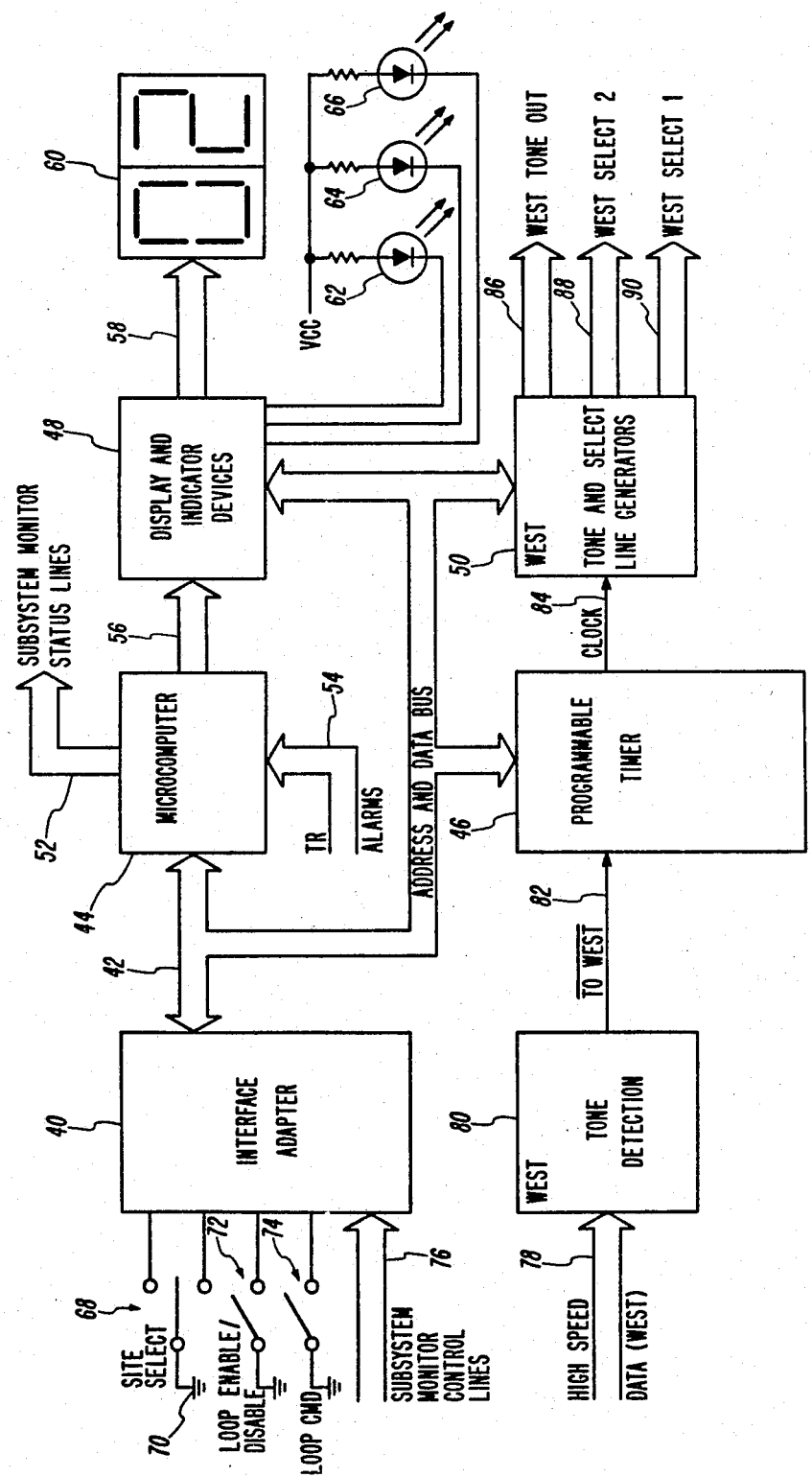
FIG. 2 is a block diagram of the test card used, in addition to the normal circuitry in an end station, to perform the test operation.
Figure 3:
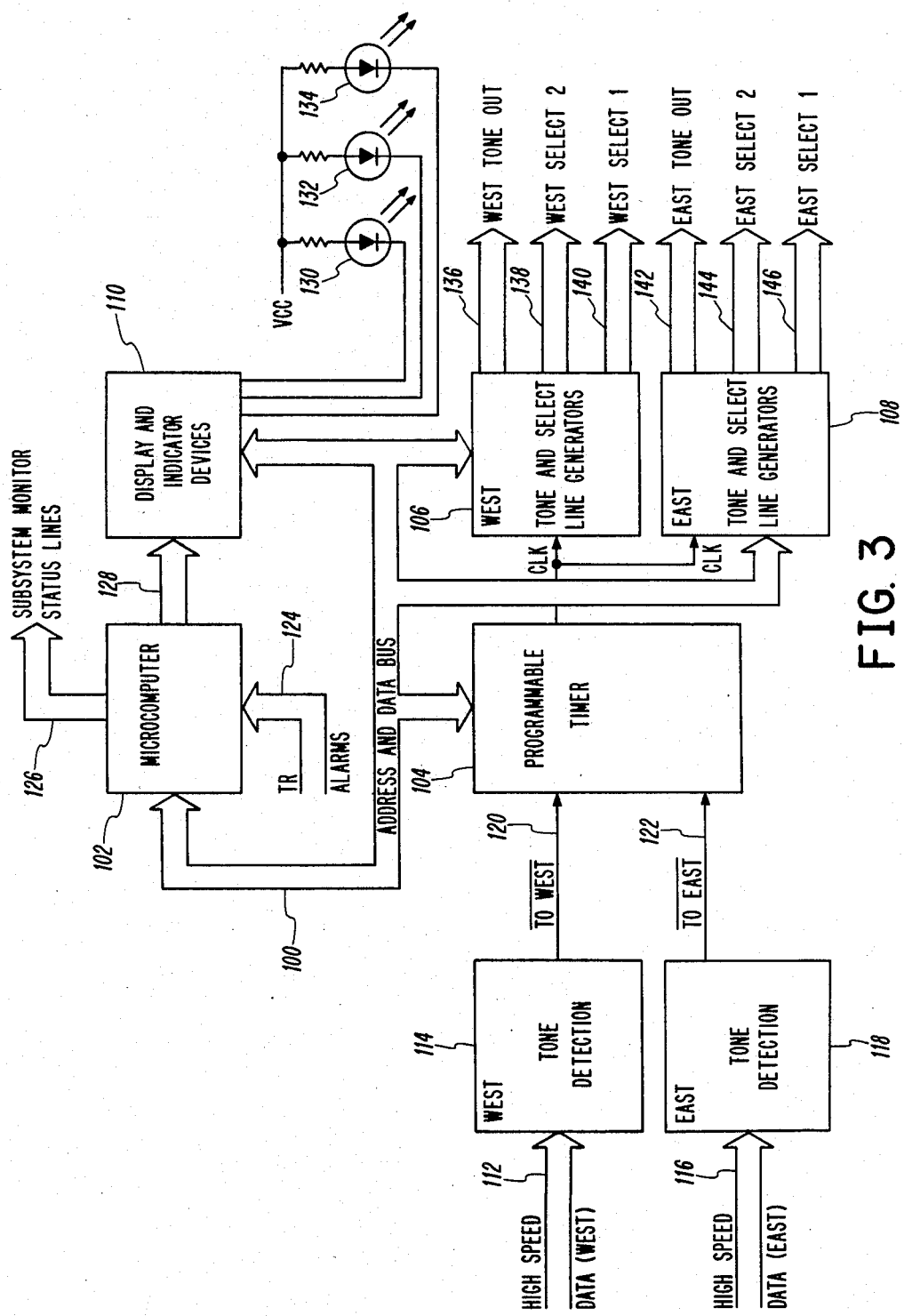
FIG. 3 is a block diagram of a very similar card to that shown in FIG. 2 which performs the signal detection and loopback configuration capabilities in the repeater stations of FIG. 1 in addition to the normal signal repeater circuitry.
Figure 4:
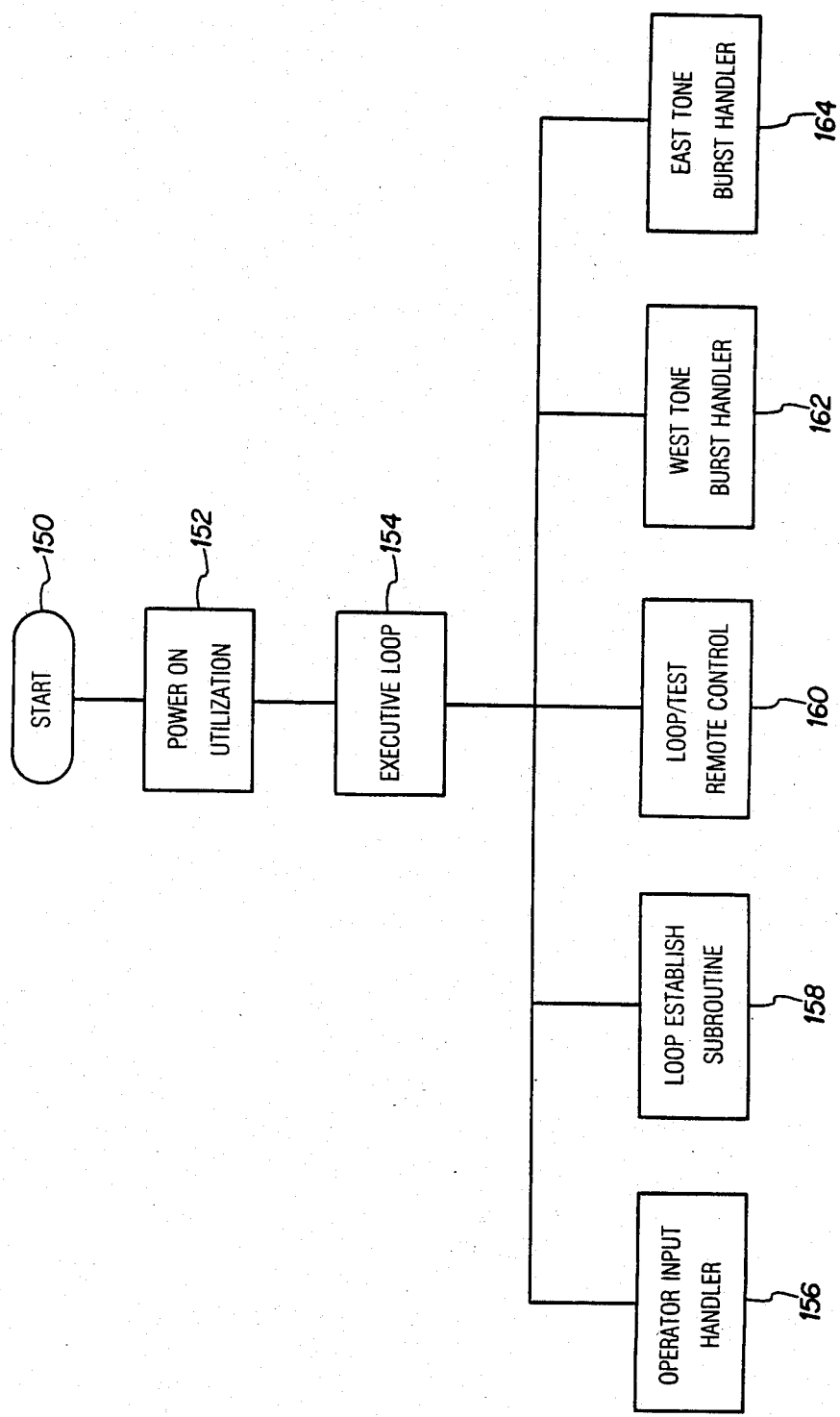

FIG. 4 is a block diagram showing the loop module firmware hierarchy used by the microcomputers in FIGS. 2 and 3 to properly react to the initialization and tone burst signals; and FIGS. 5 through 14 are flow diagrams which show in more detail the operational decisions performed by the microcomputer of FIGS. 2 and 3 in performing the tests as outlined in FIG. 4.

DETAILED DESCRIPTION

A west end terminal 10 is illustrated having a transmit or T output supplying signals across a communication lead 12 to an R or receive input of a repeater #1 labeled 14. Signals are returned by repeater 14 on a lead 16 from a T output of repeater 14 to the R input of terminal 10. The next repeater in the series connection between west end terminal 10 and east end terminal 18 is a repeater 20 having similar lead connections labeled 22 and 24 between corresponding transmit and receive sections of the repeater terminals. A third repeater is labeled 26 and has lead connections 28 and 30 between repeater 20 and repeater 26. A repeater # N is labeled 32 and is connected by a final set of connections 34 and 36 to the east end terminal 18. The three dots between repeaters 26 and 32 allow for the intermediate connection of a great many additional repeaters to complete the communication link between the end terminals 10 and 18. With present day technology, the distance between repeaters in a light wave communication system can be as much as 40 miles.

Figure 1:
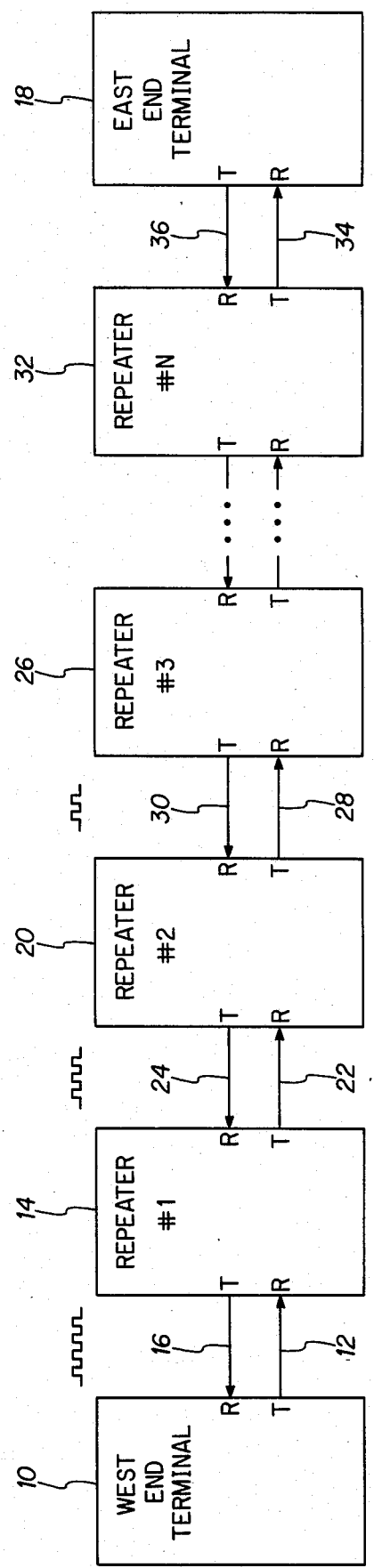
FIG. 1 is a block diagram of the communication link having a plurality of repeater stations connected in series between east and west end terminals.

As will be noted in FIG. 1, a set of four pulses is shown above the line 12 indicating the signal sent from the west terminal to repeater #1 in block 14. The three pulses above lead 22 represents the number of pulses forwarded by repeater #1 to repeater #2. Finally, the two pulses above lead 28 represent the two pulses forwarded by repeater #2 to repeater #3 in block 26. Although not shown, after repeater #3 receives two pulses, it returns a null signal to the end terminal 10 via leads 30, 24 and 16 and repeaters 2 and 1, respectively, and then returns an acknowledge pulse of similar shape as the two received to the end terminal 10.

FIG. 2 illustrates a card contained in each of the end terminals 10 and 18 of FIG. 1 and contains an interface adapter chip 40 which may be an MC 6821 as purchased from Motorola connected by a bidirectional bus 42 to an MC 6803 microprocessor chip 44 such as also may be obtained from Motorola. The bus 42 also connects these blocks 40 and 44 to a programmable timer module 46, a display and indicator device block 48 and to a west tone and select line generator 50. The programmable timer module 46 may be an MC 6840 also purchasable from Motorola. The block 44 has an output bus 52 which provides subsystem monitor and status lines and has an input of transmission alarms on a bus 54. A further output of block 44 is a bus 56 supplying signals to the display and indicator device block 48. Block 48 has an output bus 58 supplying signals to a digital display 60 and has a further set of outputs supplying signals to a plurality of LED indicators 62, 64 and 66. A switch generally indicated as 68 is connected between ground 70 and a pair of inputs to block 40. The switch 68 selects the site indication to be looped back as will be explained later. A further switch 72 is a loop enable/disable switch and is connected to a further input of the chip 40 while a switch 74 provides a loop command signal to the chip 40. A set of leads 76 supplies subsystem monitor control lines to the chip 40. A "west" high speed data signal is supplied on a set of leads 78 to a west tone detection block 80. The block 80 provides an output on a lead 82 to the programmable timer module 46 indicating when it is receiving tone pulses. The timer module 46 provides clock output signals on a lead 84 to the west tone and select line generator 50. Block 50 has a plurality of output signals on leads 86, 88 and 90 providing the signals indicated on the drawing.

In FIG. 3 a bidirectional bus 100 is connected between a microcomputer block 102, a programmable timer module 104, a west tone select line generator 106, an east tone and select line generator 108 and a display and indicator device block 110. The blocks 102 and 104 are MC 6803 and MC 6840 chips available from companies such as Motorola, as mentioned in connection with FIG. 2. The blocks 106 and 108 are 74LS174's which may be purchased from various companies such as Texas Instruments. The "west" high speed data is supplied on a set of leads 112 to a west tone detection block 114 while the "east" high speed data is supplied on a bus 116 to an east tone detection block 118. Both blocks 114 and 118 may be chips designated as NE567 which are available from various manufacturers such as EXAR Integrated Systems. Each of the blocks 114 and 118 provide leads to the timer block 104 for indicating the detection of tone pulses. These signals are provided on leads 120 and 122, respectively. Transmission alarms are supplied on a bus 124 to the block 102 while output signals indicative of subsystem monitor status lines and display indication signals are supplied on buses 126 and 128, respectively, from block 102. The set of leads 128 is connected to supply further signals to block 110. A set of leads is connected from block 110 to a plurality of light emitting diodes 130, 132 and 134 for providing indications of unit alarm, site looped west and site looped east, respectively, in a manner somewhat similar to the diode indications of FIG. 2 for the transmitter or end terminals. Each of the blocks 106 and 108 has three output buses designated as shown.

In FIG. 4 a set of blocks is used to illustrate the firmware hierarchy for the operation of the units illustrated in FIGS. 2 and 3. An oval 150 indicates the startup of the unit which provides a power-on initialization in a block 152 and then proceeds to the executive loop 154. From this loop 154 an examination of the conditions dictates which of the procedures illustrated in the blocks from 156 through 164 is followed. The block 156 would never be followed in a repeater and by definition within the software the east tone burst handler 164 would never be used in the end terminal. This is because, as defined in the software flow diagrams, the initiating terminal is always the east terminal regardless of where it is located with respect to the other end terminal.

Since all of the blocks in FIGS. 5 through 14 are labeled, it is believed unnecessary to designate any of these blocks with numbers.

OPERATION

As indicated previously, the purpose of this invention is to test a communication link between end terminals having one or more repeaters connected in series and used to periodically upgrade the quality of the signal as it travels from one terminal to the other.

As shown in FIG. 1, there are N repeaters connected in series between end terminals 10 and 18. When a technician decides to test the system, either as part of a periqdic preventive maintenance program or in response to a complaint of not receiving data at one terminal or the other, a specific request is made to cause loopback of signal at a given repeater. The waveforms used in the example of FIG. 1, are to cause a loopback in the repeater #3 also given the designation as 26 in the drawing. The looping is accomplished by first interrupting the data signal so that each of the repeaters in succession are set to an initialize condition. In this initialize condition, the repeater looks for either a new set of data signals at a high frequency or a set of loopback test tone signals at a much lower frequency. In one embodiment of the inventive concept, the data was being transmitted at 139 megahertz while the test tone for looping of the units had a base frequency of 400 kilohertz. The "null" signal to be discussed later may either be a lack of sigal or a signal of a third frequency. A series of pulses is sent out which comprises one more pulse than the number of the station to be looped back. In other words, since the third repeater was to be placed in a loopback condition, four pulses are transmitted. The first repeater in block 14 notes that it has received more than two pulses and thus, decides that it is not the repeater to be looped back. Therefore, it transmits one less pulse than received and places itself in a condition where it can forward data as received. The repeater #2 in block 20 receives the three pulses and likewise comes to the same decision and places itself in a condition where it can forward data received. Repeater #3 in block 26 notes that it has received only two pulses and therefore reconfigures its connection so that data received on the R terminal is passed out to the T output terminal returning to block 20. First, however, a null signal is passed from block 26 back through repeaters 2 and 1 to the end terminal 10. After a prescribed period of time, a single 400 kilohertz pulse is returned to the west end terminal 10 to acknowledge that a loopback condition has been set up. The terminal 10 can now send as much data as is necessary and examine the returned data to ascertain whether or not the communication loop up to repeater number 3 is operating satisfactorily. A new repeater or the east end terminal can be selected for loopback conditions by sending out a different number of pulses and checking the data from that point. When an acknowledge pulse is not received or when data is received that indicates a problem in reliable transmission, the source of the problem in the communication link is reasonably well localized to one repeater or its connecting circuitry.

Although not a direct part of the inventive concept, the output transmitter in each repeater such as the transmitter supplying signals to output terminal T in block 26 for forwarding data towards east end terminal 18 contains detection equipment to make sure that data is being properly output. If this checking equipment detects that the output signal is non-existent, it supplies a signal internally to the microcomputer within block 26 so that when a request for loopback occurs to repeater number 3, the loopback is not accomplished and the acknowledge signal is not provided even though the loopback receiver and transmitter are properly working. This additional improvement was designed to prevent a false assumption that the problem is in the following repeater or in the communication link between repeater #3 and the following repeater.

As indicated previously, FIG. 2 represents the detection and loopback circuitry for an end terminal while FIG. 3 represents the circuitry for use in a repeater station. The LED 62 in FIG. 2, as well as LED 130 in FIG. 3, when lit indicates that there is a unit alarm. However, when the LED 64 in FIG. 2 is lit it merely refers to the fact that this site is looped to the remote end terminal and the lighting of LED 66 indicates that a loop is presently established with a remote site. In FIG. 3, the lighting of the similar diodes 132 and 134 indicate, respectively, that the site is looped to the west or site is looped to the east in the repeater containing the card.

A particular site is selected for the unit of FIG. 2 by moving switch 68 either up or down to cause the display indicator 60 to indicate a higher or lower site selection number. When the proper site has been selected, the switches 72 and 74 are both energized as a precaution against only a single switch being accidentally energized. At this time, the normal flow of data is interrupted to produce the null signal followed at a prescribed time later by the series of pulses to be used by a remote site to provide a loopback condition. If the circuitry of FIG. 2 is in the remote end terminal, the reception by that terminal of the two pulses will cause a signal to be output on lead 88 from block 50 to cause a loopback connection within the end terminal 18 of FIG. 1. Normally, however, the signal would be output on leads 88 and 90 to maintain its normal connection with other communication equipment not shown supplying information to or from the terminal 18.

FIG. 3, being the circuitry involved in the repeater stations, does not need the site select interface adapter block 40 or the site select block 60 of FIG. 2. However, since it has two sets of receivers and transmitters, it adds the blocks 118 and 108. Thus, the repeater can provide a loopback either from signals being received from terminal 10 or terminal 18. The flow diagrams provided in FIGS. 5 through 14 were written under the assumption that the looping signal is always provided from the east terminal 18 towards the west although the system is designed to operate from either terminal and the east to west terminology was merely a semantics situation for ease of definition.

Figure 5:
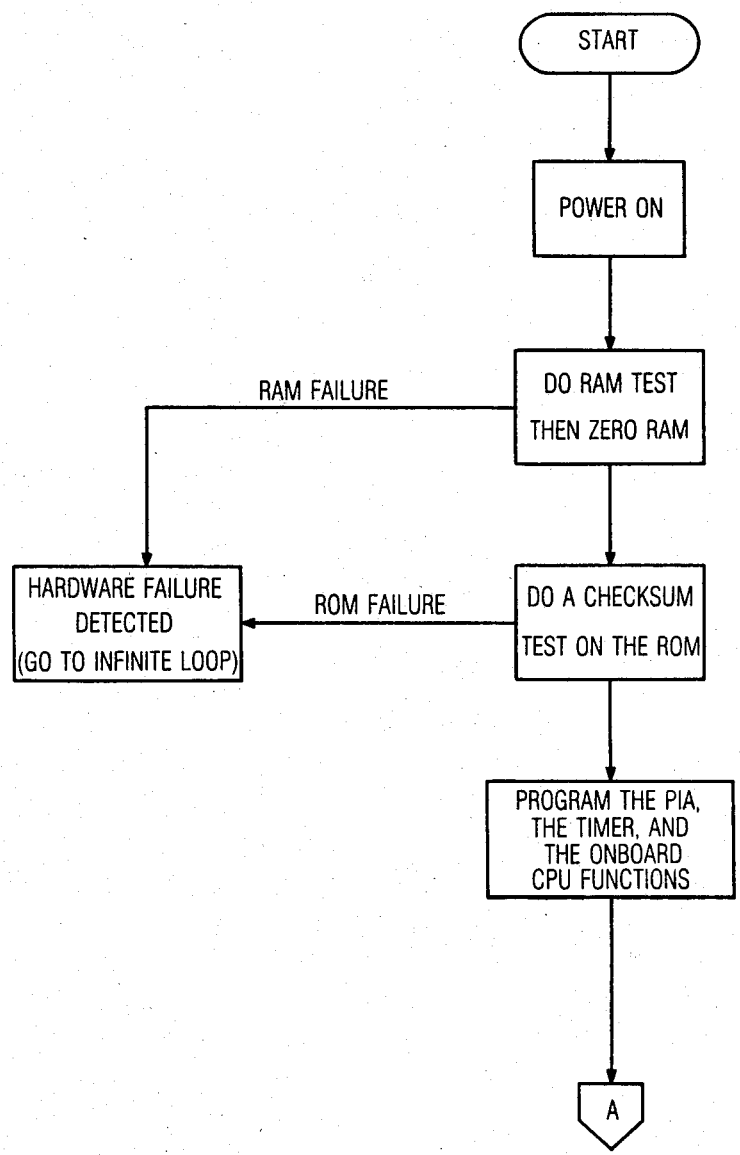
Figure 6:
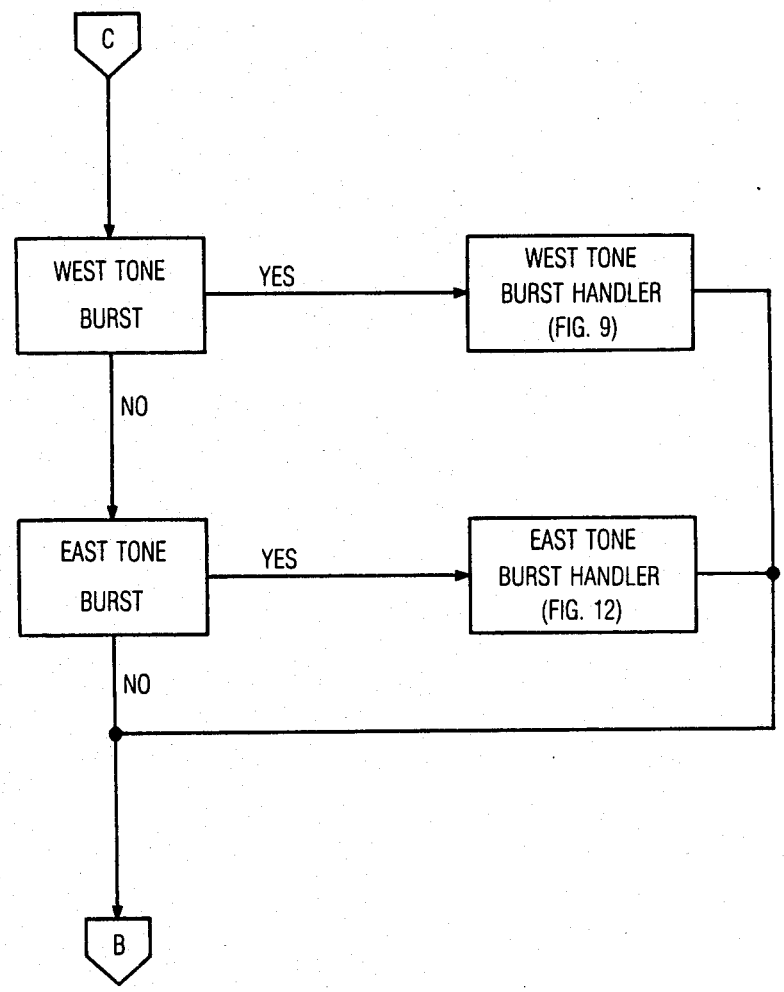
Figure 7:
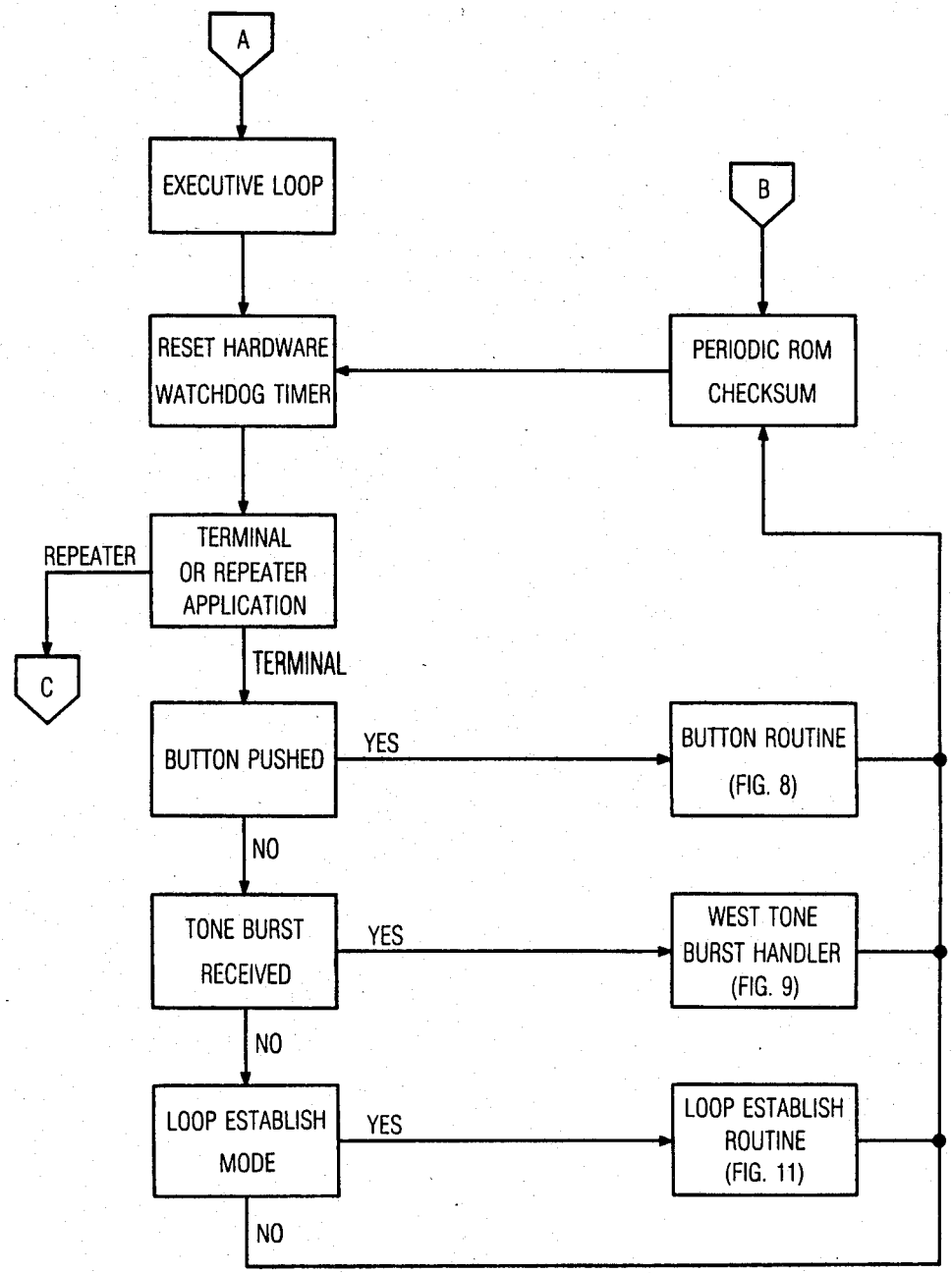
Figure 8:
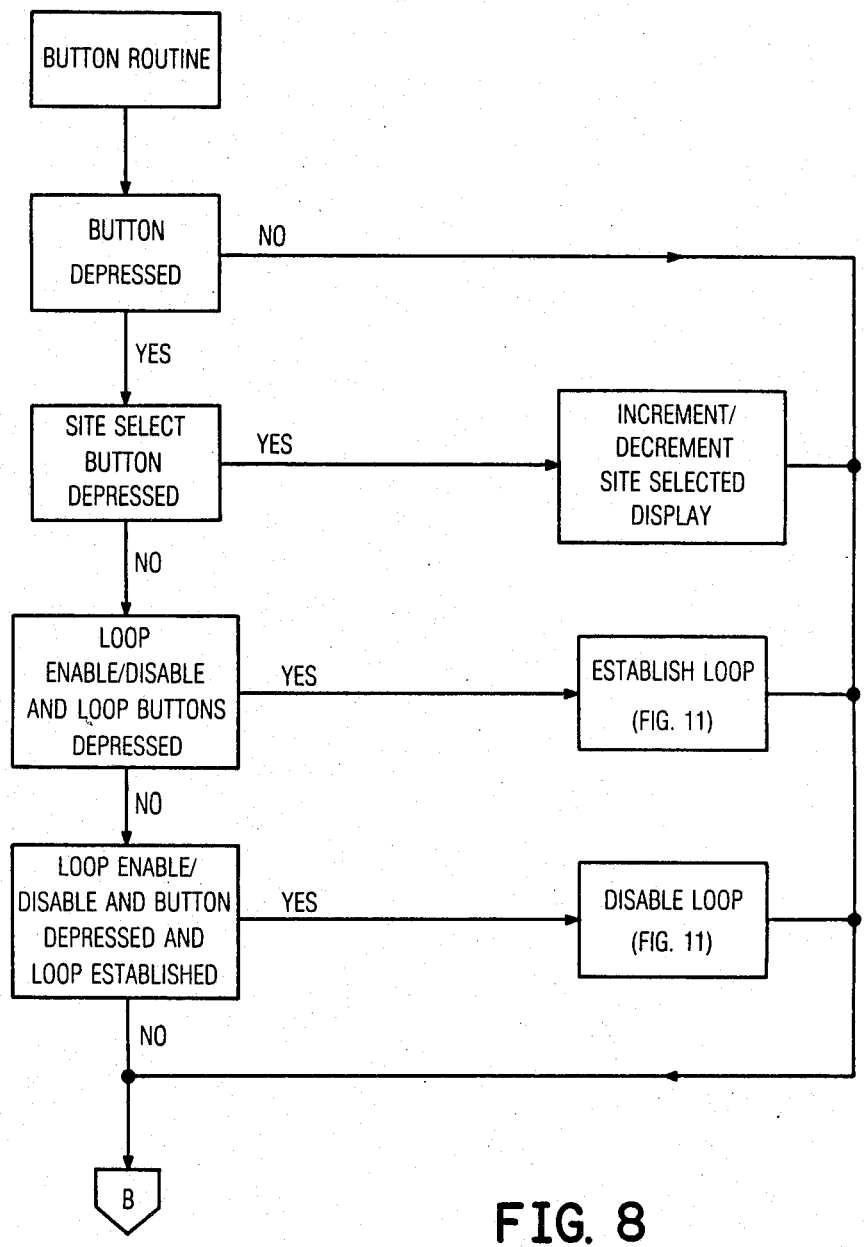
Figure 9:
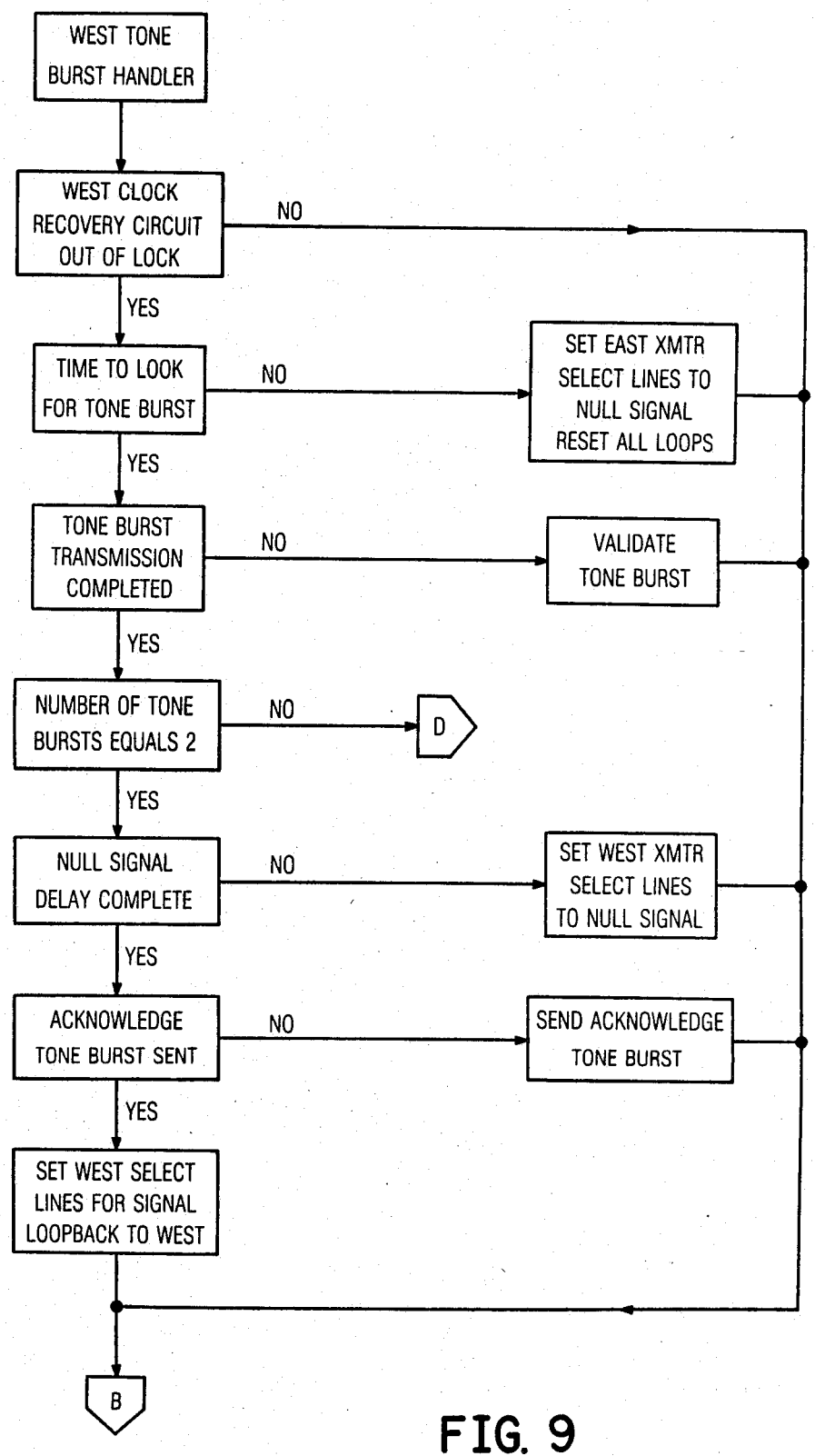
Figure 10:
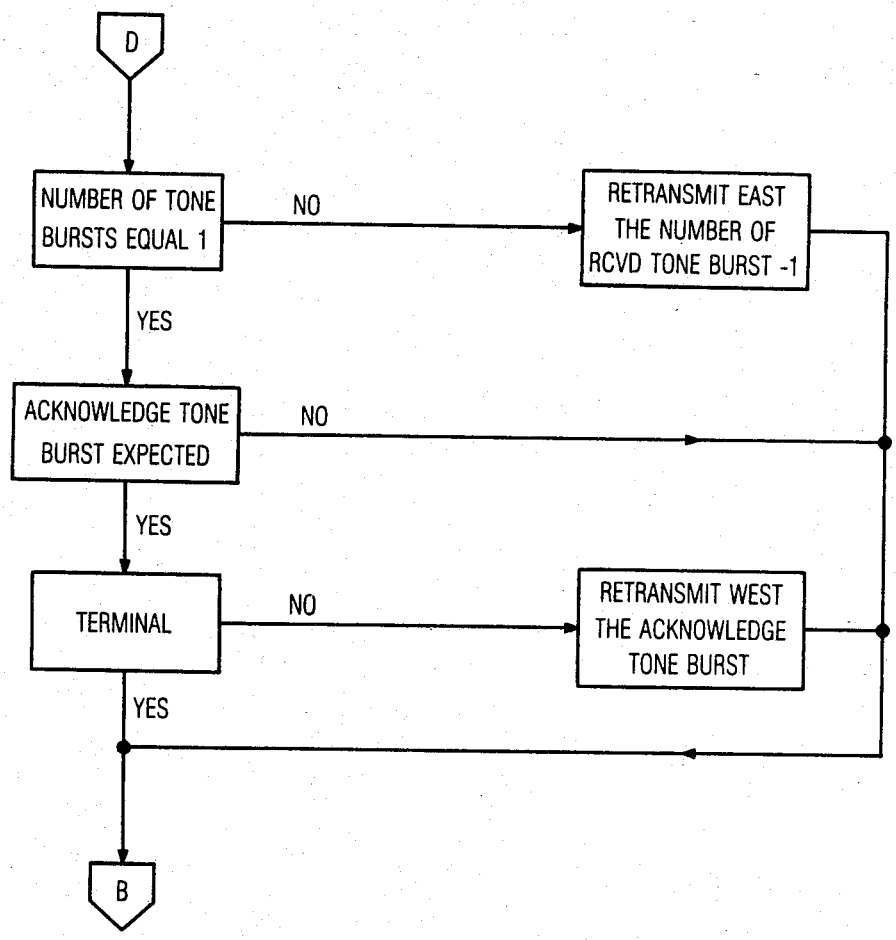
Figure 11:
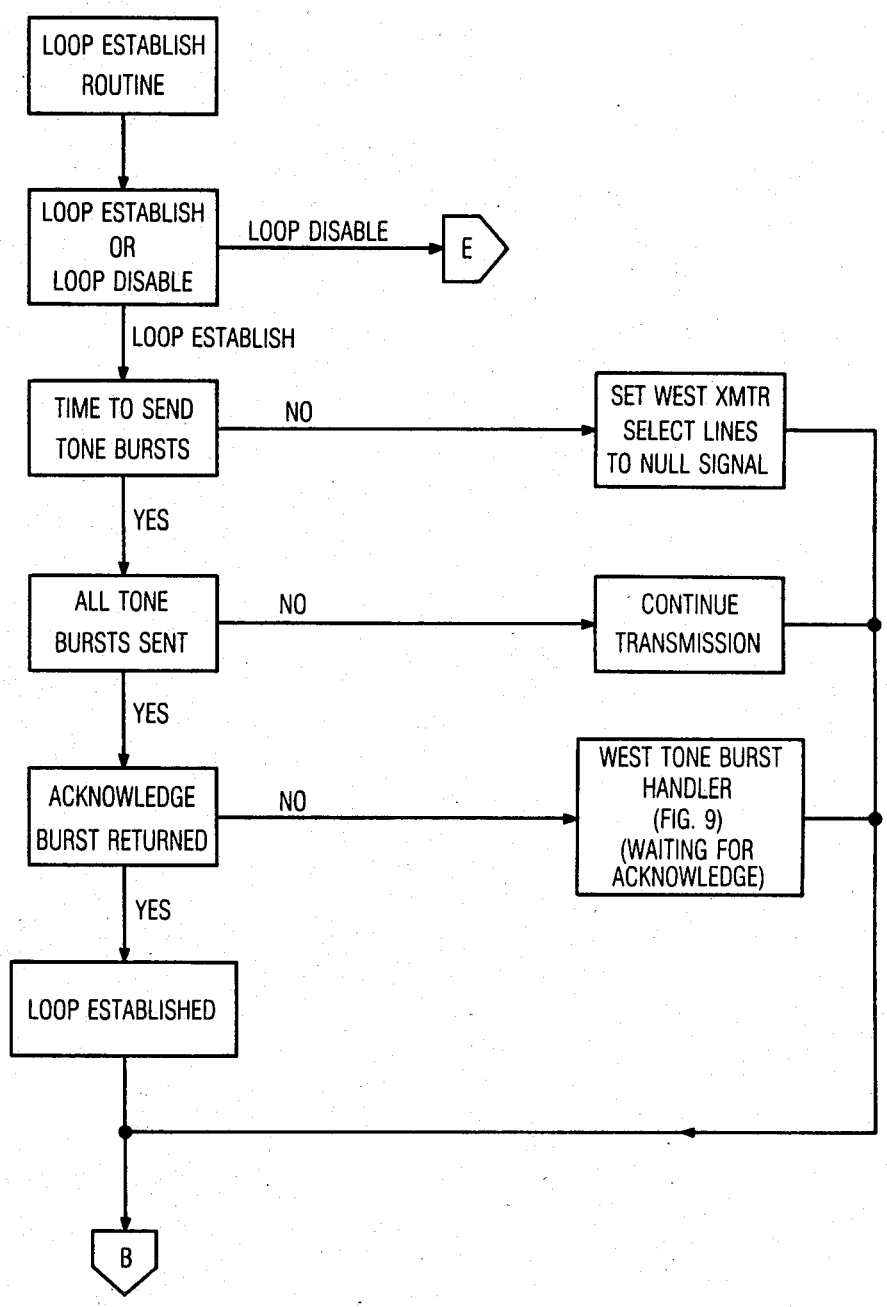
Figure 12:
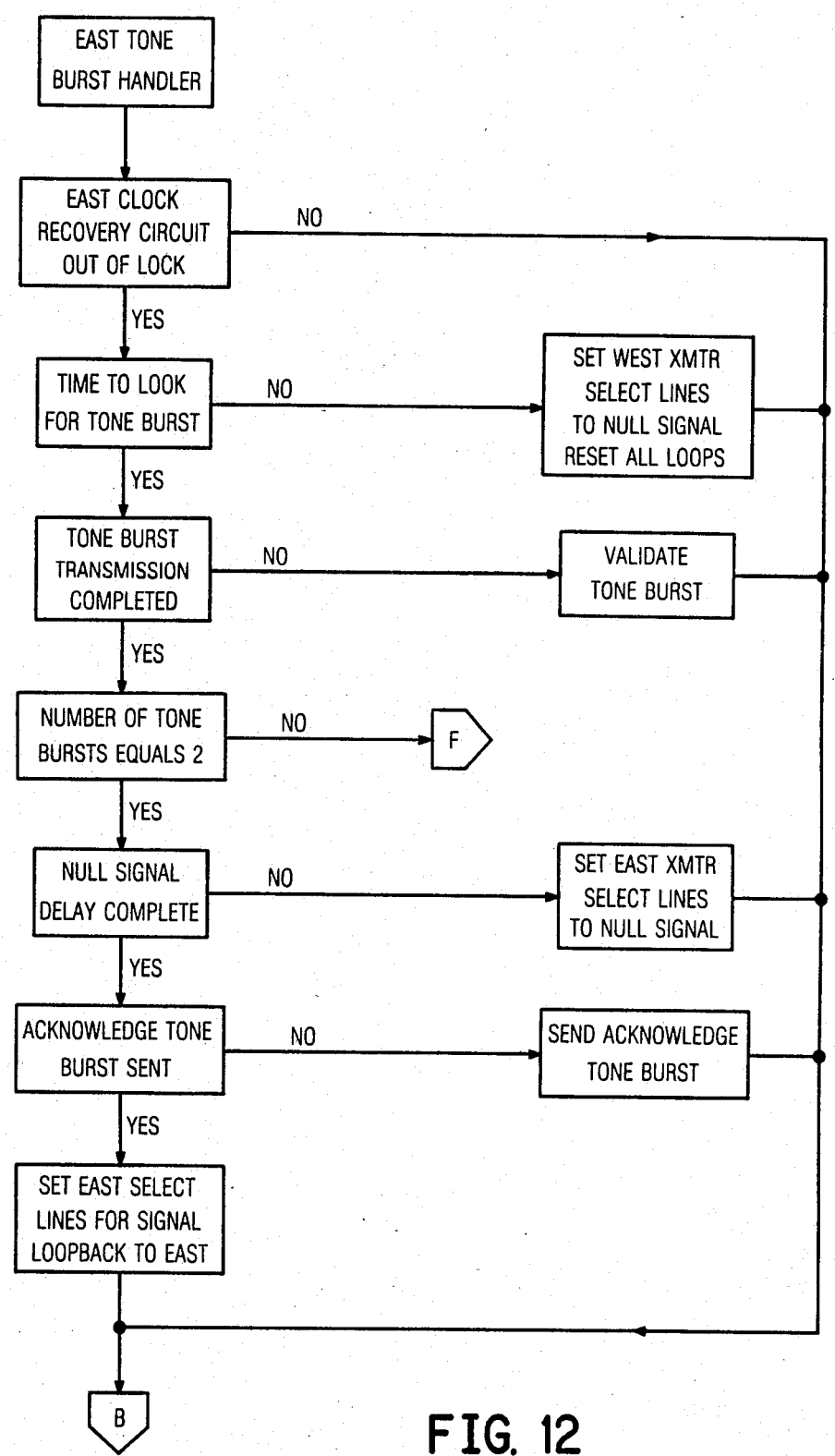
Figure 13:
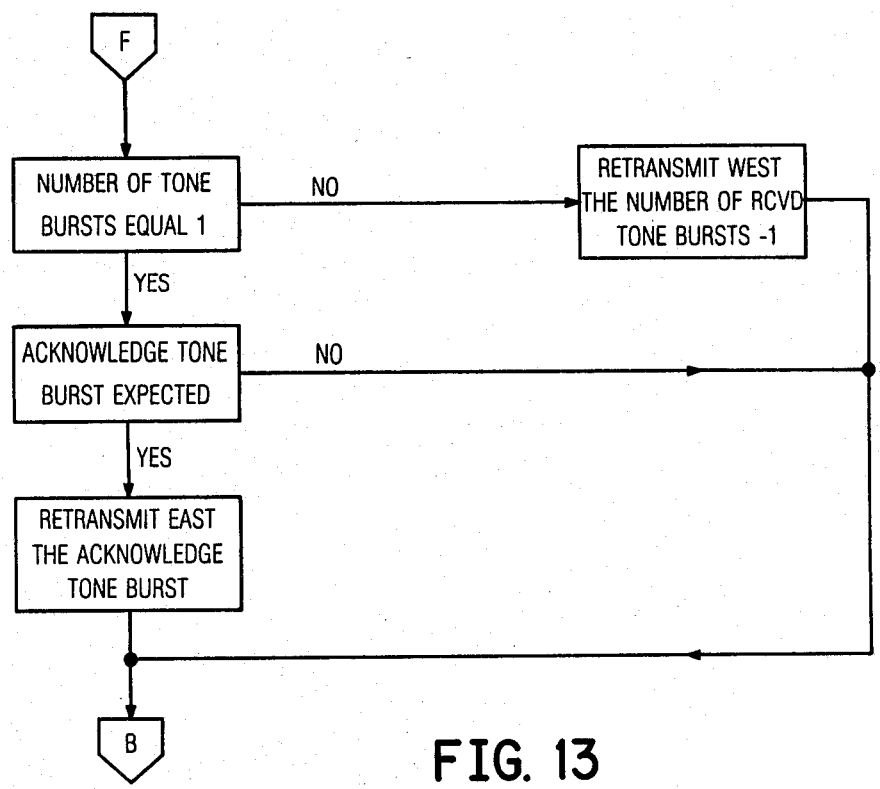
Figure 14:
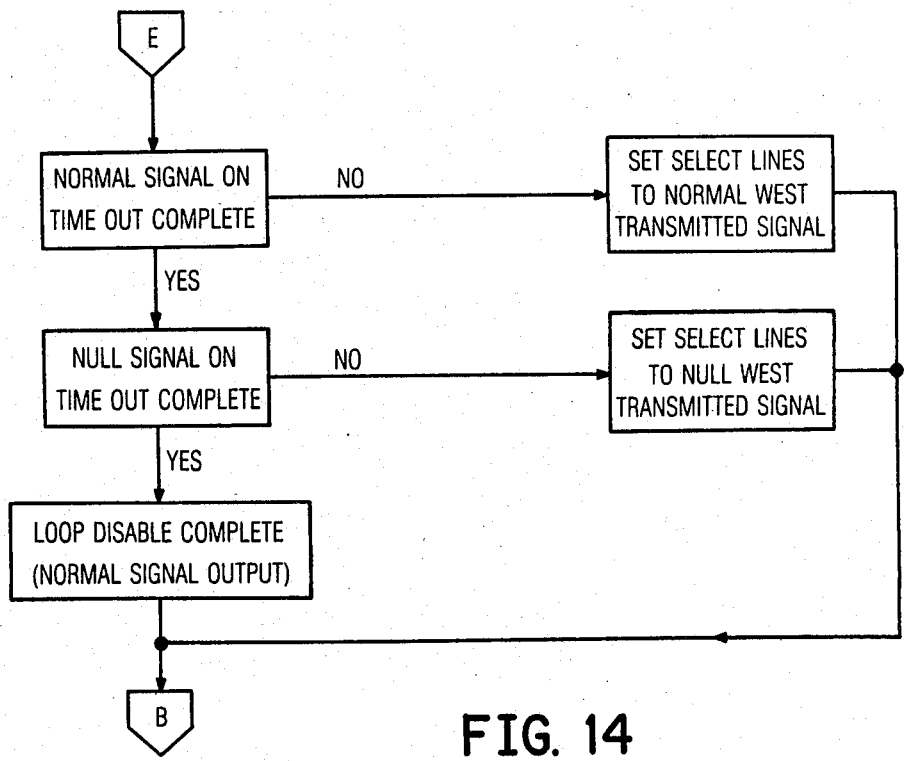

As illustrated in FIG. 4, after the unit is originally started and the power on initialization has been completed, the microprocessor remains in the executive loop referenced by block 154 until it detects the pushing of a button if the unit is a terminal or it detects an east or west tone burst after the occurrence of a null. As will be noted, the checks for power on initialization of block 152 are illustrated in FIG. 5. The routines that are processed if the unit is a terminal are illustrated in FIG. 7 and the associated FIGS. 8, 9, and 11. If, on the other hand, the unit is a repeater, the procedures are provided in FIG. 6 and associated FIGS. 9 and 12. It is believed that these flow diagrams are very descriptive and self-explanatory and further reference to these Figures is not required.

In summary, the present inventive concept and the circuitry illustrated, are used to create a primary signal loopback at a repeater or remote terminal site for the purpose of creating a test environment in which an operator at a single end terminal site can determine the approximate location of a fault within a communication link of which that terminal is a part.

This process is accomplished by having a person set up a given end terminal defined as an east end terminal. This is commenced by setting in the position in the communication link of that terminal to be looped. The end terminal microcomputer's first task is to change the west transmitter select lines to force the transmitter to use a null as its output signal. Thus, the high frequency transmit signal from the terminal is removed and a null is placed on the line. After a time delay necessary to propagate the signal through the communication link, the end terminal microcomputer outputs a low frequency test tone on the communication link. After a prescribed period of time, such as 250 microseconds, the microcomputer disables the tone and returns the signal out to a null. A further 250 microsecond gap of null is used in one embodiment of the invention before another low frequency test tone burst is output. As indicated, the number of tone bursts is equal to the number of sites plus one away from the west end terminal as defined in the initial site setup. Once the last tone burst is output from the end terminal, the terminal microcomputer begins watching the west receiver in expectation of receiving an acknowledge tone burst from the looped repeater or west end terminal. The first signal to be received will be the receiver data clock regenerator phase lock loop contained internal to the terminal going out of lock. This indicates that a loss of signal from the west has occurred. After a reasonably prescribed time delay, the tone decoder chip in the terminal should detect an incoming test frequency tone burst and a low signal pulse is put out to a timer. The tone decoder pulse is timed to ensure that it falls within specified limits. In other words, it is checking to make sure that the pulse is not from a source other than the looped repeater or end terminal. When the terminal microcomputer verifies the validity of the acknowledge tone burst, the LED's such as 64 and 66 in FIG. 2, are lighted to inform the operator of the existence of a good loop.

The operation of intermediate repeaters such as 14 and 20 in FIG. 1, is naturally different from the repeater being looped. The first event that the non-looped repeater will see is the fact that the east receiver data clock regenerator goes out of lock. This indicates that a loss of signal from the east has occurred. After a delay to guarantee that the signal will stay out of lock, the microcomputer will begin preparations for the looping sequence. The microcomputer will reset all previous looping conditions at this site to normal transmission and it will set a set of select lines for the west transmitter to force output of a null signal on the communication link to the next unit to the west. This, thus, propagates the null signal further down the network. The processor will then wait for an indication of the test tone from the east.

After a time delay, the tone decoder chip should detect an incoming test tone signal and put out a signal to the timer. Again, the tone decoder pulse is timed as it is in the transmitting terminal to ensure that the receive tone burst falls within specified limits. Once the microcomputer verifies the arrival of a proper first pulse, it waits for more tone bursts. The arrival of more than two tone bursts signals the microcomputer that this is not the site to be looped. The microcomputer now enables an appropriate frequency test tone out on its west tone out signal to the transmitter. The transmitted test tones are identical with those supplied by the east end terminal or as in one embodiment of the invention, a tone of 250 microseconds and a 250 microsecond null gap following. The microprocessor will propagate one less tone burst than it received. When the processor in the intermediate repeater does not detect a tone burst from the east for a specified period of time, the end of tone burst stream will be assumed. The microcomputer now begins waiting for a loop acknowledge tone burst coming from the west. Again, the first signal to be received will be the receiver data clock regenerator phase lock loop going out of lock but this time it will be from the west receiver. This will indicate that a loss of signal from the west has occurred. The microcomputer will change the east transmitter select lines to output a null which will then be propagated to the east. After a time delay, the tone decoder chip should detect the incoming 400 kilohertz acknowledge tone burst. The microcomputer will recognize this tone burst as the acknowledge burst and send out a 400kilohertz tone on the east tone out transmitter. Once the east tone burst is complete, the microcomputer will return the select lines in both directions to normal operation.

The site which is being looped operates in a similar initial fashion to the intermediate repeaters except that after receiving the first two tone bursts, the microcomputer decides that when none are received in a specified time, that this is the site to be looped. Once this decision has been made, the microcomputer sets the select lines for the east transmitter to output a null signal. After a delay time long enough to allow the propagation of the null signal back to the looping terminal, the microcomputer enables a 400 hertz acknowledge tone burst to the east. When the tone burst is complete, the microcomputer configures the select lines for the east transmitter to a configuration that causes the east and west transmitters to use the receive data from the east as their output.

As mentioned previously, if the microcomputer in monitoring the west transmitter has determined that there is a problem in the west transmitter of the repeater to be looped, it will inhibit the acknowledge tone burst and return to a no loop status. This sequence should help isolate the problem for the operator at the east terminal attempting to determine the source of the problem for the special situation of a failure of a transmitter facing away from the loop commanding terminal.

While I have described a single embodiment of the inventive concept using specifics employed in a first implementation of the inventive concept, I wish to be limited not by the specifics provided but only by the scope of the appended claims wherein I claim:

1. The method of testing a communication link including at least a transmitter, a remote receiver and a plurality of intermediate repeater stages for localizing the section of the communication link having transmission problems, comprising the steps of:
   interrupting the flow of information from transmitter to remote receiver with a "null" signal for a time sufficient to cause all intermediate receiver stages to reset to an initialized condition;
   transmitting N+1 pulses of predetermined length and of a frequency distinguishable from the frequency of data signal;
   detecting the frequency of signals received after initialization and setting each receiver stage to a data or test condition in accordance with the frequency of the detected signal;
   receiving transmitted pulses at each intermediate receiver stage in succession and transmitting one less pulse than received when more than two pulses are received;
   altering the signal path conditions, in the intermediate receiver stage receiving only two pulses, to a loopback configuration;
   transmitting a test signal from the transmitter through said looped communication link to said remote receiver and back when that looped communication is operational; and
   clearing the communication link by transmitting a null signal for initializing each intermediate receiver and returning same to normal signal transmission conditions between said transmitter and said remote receiver when testing is completed.

2. The method as claimed in claim 1 comprising the additional step of:
   acknowledging receipt of the loopback signal at the receiver stage receiving only two pulses by returning a single pulse to the transmitter on the return path of said communication link.

3. The method of remotely localizing the area of failure in a multiple repeater station communication link between two end terminals comprising the steps of:
   interrupting the transmission of signal long enough for detection of a "null" by receiving equipment in the repeater station;
   transmitting N+1 pulses of a predetermined length and of a frequency distinguishable from the frequency of data signals with predetermined "null" signal times between the transmitted pulses from one of said end terminals;
   detecting the frequency of signals received after initialization and setting each receiver stage to a data or test condition in accordance with the frequency of the detected signal;
   retransmitting one less pulse than received, by each repeater station that receives more than two pulses, to the following repeater station in the communication link wherein the retransmitted pulses have the same timing characteristics as the originally transmitted pulses;
   reconnecting the repeater station that receives only two pulses in a loopback configuration;
   transmitting a test signal from said terminal and checking for receipt of same by said terminal due to the loopback connection at said remote repeater station; and repeating the above steps for repeater stations further away by incrementing the number of pulses N until the test signal is not returned from a requested remote repeater station.

4. The method of signaling a specific repeater station "N", in a communication link having more than N repeater stations wherein the station N is the Nth station in the communication link, to change modes of operation comprising the steps of:

establishing an initializing set of conditions on said communication link through a "null" signal;

transmitting a set of N+1 pulses having predetermined characteristics distinguishable from data signal characteristics over said communication link;

detecting the characteristics of the signal received at each repeater station after establishment of the initialized condition for setting an operational mode in said repeater station in accordance with the characteristics of the received signal to a data or test mode;

removing one of said pulses from the received set of pulses, by each repeater station that receives more than two pulses, and forwarding the remaining pulses to the next successive repeater station in said communication link;

providing a specific configuration in the repeater station that receives only two pulses in response to those two pulses and their predetermined characteristics; and maintaining the condition of said mode and said specific configuarion until an initializing set of conditions is again provided on said communication link.

5. Apparatus for testing a communication link including at least an end terminal transmitter, a remote end terminal receiver and a plurality of intermediate repeater stages for localizing the section of the communication link having transmission problems comprising, in combination:

communication link end terminal transmitter first means for interrupting the flow of information from transmitter to remote receiver with a "null" signal for a time sufficient to cause all intermediate receiver stages to reset to an initialized condition;

second means, comprising a part of said first means, for transmitting N+1 pulses of predetermined length and of a frequency distinguishable from that used in data transmission;

a plurality of repeater stations connected in series in said communication between end terminals, each repeater station including;

"null" signal detection means for reinitializing each repeater station upon reception and detection of the "null" signal and for setting said repeater station to a test or a data condition in accordance with the frequency of the next received signal;

third means for receiving transmitted pulses at each intermediate receiver stage in succession and for transmitting one less pulse than received when more than two pulses are received; and fourth means for altering the signal path condition, in the intermediate repeater stage receiving only two pulses, to a loopback configuration;

fifth means, comprising a part of said end terminal means, for transmitting a test signal through said looped communication link;

sixth means, comprising a part of said end terminal means, for clearing the communication link by transmitting a null signal for initializing each intermediate receiver and returning same to normal signal transmission conditions between the transmitter of said end terminal and a remote end terminal receiver at the other end of said communication link, if no faults are detected; and seventh means for providing an indication that no faults were detected in a given N+1 pulse transmission test.

6. Apparatus as claimed in claim 5 comprising, in addition:

eighth means for returning an acknowledgement pulse to said end terminal transmitter over the return path of said communication link by the looped back intermediate repeater stage thereby indicating that the link is ready to be tested.

7. Apparatus for remotely localizing the area of failure in a multiple repeater station communication link between two end terminals comprising, in combination:

end terminal first means for interrupting the transmission of data signals long enough for detection of an initializing "null" signal by receiving equipment in the repeater stations;

end terminal second means for transmitting N+1 pulses of a predetermined frequency and length with predetermined "null" signal times between the transmitted pulses from one of said end terminals;

a plurality of repeater station third means connected in series in the communication link between end terminals, each of said third means including retransmitting fourth means, reconnecting fifth means, "null" signal detecting and initializing sixth means and further means to set the station to test or data transmission modes in accordance with signals first received after receipt of an initializing "null" signal;

said fourth means portion of each of said third means retransmitting one less pulse than received to the following repeater station in the communication link wherein the retransmitted pulses have the same timing characteristics as the originally transmitted pulses;

said fifth means reconnecting the repeater station that receives only two pulses in a loopback configuration; and end terminal seventh means for transmitting a test signal from said end terminal and checking for receipt of same by said end terminal due to the loopback connection at said remote repeater station.

8. The method of eliminating the requirement for data stream decoding to detect test signal interrupts in a repeater station intermediate end terminals in a communication link normally transmitting data at a first frequency comprising the steps of:

interrupting normal data being transmitted at said first frequency from one end terminal to the other with a "null" signal for a time sufficient to cause a reset of the intermediate repeater stations to an initialized condition;

transmitting a test interrupt signal at a second frequency distinguishable from said first frequency;

detecting the frequency of the signal being received at the repeater station and setting the station to one of test or data transmission conditions based on the frequency of the signals detected; and maintaining the set condition at said repeater station until a further "null" signal is received causing a return of said repeater station to an initialized condition.

9. Repeater station apparatus for use in a communication link sending data at a first frequency between end terminals comprising, in combination:

a pair of signal detection receiver means for receiving signals from the east and the west;

a pair of signal transmission means for transmitting, to both the east and the west, amplified versions of signals received by a connected receiver means;

signal detection first means for resetting the circuitry to an initialized condition where the east receiver is connected to the west transmitter and the west receiver is connected to the east transmitter whenever a null signal is received; and signal detection second means for reconnecting a given receiver means in a loopback condition to the complementary transmitter means whenever a predetermined signal of a second frequency, where said second frequency is distinguishable from said first frequency, is received immediately after a null signal has been detected and the circuitry has been reset to an initialized condition.

10. Apparatus as claimed in claim 9 wherein said signal detection second means maintains said loopback condition until said first means detects receipt of a further null signal.

* * * * *